(12) United States Patent
Eckel et al.

(10) Patent No.: US 10,943,233 B2
(45) Date of Patent: Mar. 9, 2021

(54) SYSTEM AND METHOD FOR TRANSACTION AUTHENTICATION

(71) Applicant: MorphoTrust USA, LLC, Billerica, MA (US)

(72) Inventors: Robert Andrew Eckel, Andover, MA (US); Mohamed Lazzouni, Northborough, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/428,498

(22) Filed: May 31, 2019

(65) Prior Publication Data

US 2020/0126082 A1     Apr. 23, 2020

Related U.S. Application Data

(63) Continuation of application No. 14/220,547, filed on Mar. 20, 2014, now Pat. No. 10,311,435.

(60) Provisional application No. 61/806,156, filed on Mar. 28, 2013.

(51) Int. Cl.
  *G06Q 20/40*  (2012.01)
  *G06Q 20/32*  (2012.01)

(52) U.S. Cl.
  CPC ..... *G06Q 20/4014* (2013.01); *G06Q 20/3226* (2013.01)

(58) Field of Classification Search
  USPC ..................................................... 705/35, 44
  See application file for complete search history.

(56) References Cited

U.S. PATENT DOCUMENTS

| | | | |
|---|---|---|---|
| 5,469,506 A | 11/1995 | Berson |
| 5,984,366 A | 11/1999 | Priddy |
| 6,269,169 B1 | 7/2001 | Funk et al. |
| 6,418,232 B1 | 7/2002 | Nakano |
| 7,239,734 B2 | 7/2007 | Alattar et al. |
| 7,363,505 B2 | 4/2008 | Black |
| 7,561,716 B2 | 7/2009 | Ho et al. |
| 8,028,896 B2 | 10/2011 | Carter et al. |
| 8,059,858 B2 | 11/2011 | Brundage |
| 8,083,130 B1 | 12/2011 | Cipriano |

(Continued)

FOREIGN PATENT DOCUMENTS

| WO | WO 2001/043026 | 6/2001 |
|---|---|---|
| WO | WO 2005/038583 | 7/2006 |

OTHER PUBLICATIONS

How to turn your driver's license into a debit card MacDonald (Year: 2009).*

(Continued)

*Primary Examiner* — William E Rankins
(74) *Attorney, Agent, or Firm* — Fish & Richardson P.C.

(57) ABSTRACT

Some implementations provide a method that includes: generating an association, at a mobile device, between a government-issued identification document of a user and a mode of payment; receiving, at the mobile device, a presentation of the government-issued identification document of the user to support a request for payment; validating whether the presented government-issued identification document is a valid identification of the user; and in response to validating the presented government-issued identification document, proceeding with payment by using the mode of payment.

20 Claims, 14 Drawing Sheets

(56) References Cited

U.S. PATENT DOCUMENTS

| | | |
|---|---|---|
| 8,087,583 B2 | 1/2012 | Hawes |
| 8,234,172 B2 | 7/2012 | Hagale et al. |
| 8,543,823 B2 | 9/2013 | Carr |
| 9,129,451 B2 | 9/2015 | Frueh |
| 9,481,197 B2 | 11/2016 | Eckel et al. |
| 2002/0169962 A1 | 11/2002 | Brundage |
| 2002/0169963 A1 | 11/2002 | Seder et al. |
| 2003/0086591 A1 | 5/2003 | Simon |
| 2003/0150907 A1 | 8/2003 | Metcalf |
| 2003/0169899 A1 | 9/2003 | Slepyan |
| 2003/0173046 A1 | 9/2003 | Jaaskelainen |
| 2004/0081332 A1 | 4/2004 | Tuttle et al. |
| 2004/0104268 A1 | 6/2004 | Bailey |
| 2004/0128512 A1 | 7/2004 | Sharma |
| 2004/0158724 A1 | 8/2004 | Carr et al. |
| 2004/0181671 A1 | 9/2004 | Brundage et al. |
| 2004/0190757 A1 | 9/2004 | Murphy et al. |
| 2004/0215557 A1 | 10/2004 | Michelsen |
| 2004/0250142 A1 | 12/2004 | Feyler |
| 2005/0078851 A1 | 4/2005 | Jones |
| 2005/0125360 A1 | 6/2005 | Tidwell et al. |
| 2006/0157559 A1 | 7/2006 | Levy et al. |
| 2006/0168213 A1 | 7/2006 | Richardson |
| 2006/0197337 A1 | 9/2006 | Merry |
| 2007/0255620 A1 | 11/2007 | Tumminaro et al. |
| 2007/0294296 A1 | 12/2007 | Silver |
| 2008/0174100 A1 | 7/2008 | Reeves |
| 2009/0132415 A1 | 5/2009 | Davis |
| 2009/0183008 A1 | 7/2009 | Jobmann |
| 2009/0229936 A1 | 9/2009 | Cuong |
| 2010/0250290 A1* | 9/2010 | Lefkowitz ............ G06Q 20/204 705/5 |
| 2010/0289614 A1 | 11/2010 | Rechner et al. |
| 2011/0022531 A1 | 1/2011 | Jordan |
| 2011/0320316 A1* | 12/2011 | Randazza ............ G06Q 20/023 705/26.43 |
| 2012/0114192 A1 | 5/2012 | Bladel et al. |
| 2012/0300975 A1 | 11/2012 | Chalamala |
| 2012/0330769 A1 | 12/2012 | Arceo |
| 2013/0013527 A1 | 1/2013 | Takata et al. |
| 2013/0275303 A1 | 10/2013 | Fiore |
| 2017/0103260 A1 | 4/2017 | Eckel et al. |
| 2019/0065844 A1 | 2/2019 | Eckel |

OTHER PUBLICATIONS

Exented European Search Report for European Application No. 14807295.2, dated Mar. 17, 2017, 5 pages.

Hassanien, "Hiding Iris Data for Authentication of Digital Images Using Wavelet Theory," Pattern Recognition and Image Analysis, Dec. 2006, 16(4):637-643.

International Search Report and the Written Opinion dated Jul. 15, 2014 from International Application No. PCT/US2014/023998, 14 pages.

International Search Report and the Written Opinion dated Oct. 20, 2014 from International Application No. PCT/US2014/38788, 10 pages.

International Search Report and the Written Opinion dated Sep. 5, 2014 in International Application No. PCT/US2014/031306, 12 pages.

Jain et al., "Biometrics: A Tool for Information Security," IEEE Transactions on Information Forensics and Security, Jun. 2006, 1(2):125-143.

Kim et al., "Multimodal biometric image watermarking using two-stage integrity verification," Signal Processing, Dec. 2009, 89(12):2385-2399.

Sasi et al., "Multimodal Biometric Digital Watermarking on Immigrant Visas for Homeland Security," Biometric Technology for Human Indentification, Apr. 2004, 5004:425-435.

* cited by examiner

SYSTEM AND METHOD FOR TRANSACTION AUTHENTICATION

CROSS-REFERENCE TO RELATED APPLICATIONS

This application is a continuation of U.S. application Ser. No. 14/220,547, filed Mar. 20, 2014, now issued U.S. Pat. No. 10,311,435, which claims priority to U.S. Provisional No. 61/806,156 filed Mar. 28, 2013.

TECHNICAL FIELD

This document generally relates to mobile transactions on mobile devices.

BACKGROUND

Mobile computing devices may engage in mobile transactions such as on-line credit/debit card payment. These mobile transactions may be authenticated to combat on-line fraud and identity theft.

SUMMARY

In one aspect, some implementations provide a method that includes: generating an association, at a mobile device, between a government-issued identification document of a user and a mode of payment; receiving, at the mobile device, a presentation of the government-issued identification document of the user to support a request for payment; validating whether the presented government-issued identification document is a valid identification of the user; and in response to validating the presented government-issued identification document, rendering with payment by using the mode of payment.

Implementations may include one or more of the following features. The method may further include registering an account of the user on the mobile device to support the mode of payment; and authenticating that the user owns the account. The association may additionally include associating, on the mobile device, the authenticated account with the government-issued identification document. The association may further include linking the authenticated account owned by a first user to the government-issued identification documents held by a second user, different from the first user. Registering the account further comprises: registering a bank account, an intermediary account, or a credit card account.

The receiving may include: reading personal identification information (PII) from multiple machine-readable zones (MRZs) on the government-issued identification document. The receiving may further include: correlating, at the mobile device, personal identification information (PII) read from multiple machine-readable zones (MRZs). The validating may include: checking personal identification information (PII) read from multiple machine-readable zones against a system of record. The validating may further include: transmitting personal identification information (PII) read from multiple machine-readable zones (MRZs) to a server hosting the system of record; receiving, from the server, validation results of checking personal identification information against the system of record.

The rendering payment may include drawing funds from the registered account to fulfill the request for payment without additional authentication that the user owns the registered account. The rendering payment may include drawing funds from the registered account of a first user to fulfill the request for payment from a second user, different from the first user. The rendering payment may also include paying through a debit card without presenting the debit card, paying through an intermediary account without authentication for the intermediary account, or paying through a credit card without presenting the credit card.

In another aspect, some implementations provide a mobile device that includes at least one processor configured to: generate an association between a government-issued identification document of a user and a mode of payment; receive a presentation of the government-issued identification document of the user to support a request for payment; validate whether the presented government-issued identification document is a valid identification of the user; and in response to validating the presented government-issued identification document, render payment by using the mode of payment.

Implementations may include one or more of the following features. The at least one processor may be further configured to: register an account of the user on the mobile device to support the mode of payment; and authenticate that the user owns the account. The at least one processor may be further configured to: associate the authenticated account with the government-issued identification document. The at least one processor may be further configured to associate the authenticated account with the government-issued identification document by linking the authenticated account owned by a first user to the government-issued identification documents held by a second user, different from the first user. The at least one processor may be further configured to register the account by registering a bank account, an intermediary account, or a credit card account.

The at least one processor may be further configured to: read personal identification information (PII) from multiple machine-readable zones (MRZs) on the government-issued identification document. The at least one processor is further configured to: correlate personal identification information (PII) read from multiple machine-readable zones (MRZs). The at least one processor is further configured to: check personal identification information (PII) read from multiple machine-readable zones against a system of record. The at least one processor is further configured to transmit personal identification information (PII) read from multiple machine-readable zones (MRZs) to a server hosting the system of record; and receive, from the server, validation results of checking personal identification information against the system of record.

The at least one processor may be further configured to render payment by drawing funds from the registered account to fulfill the request for payment without additional authentication that the user owns the registered account. The at least one processor may be further configured to render payment by drawing funds from the registered account of a first user to fulfill the request for payment from a second user, different from the first user. The at least one processor may be further configured to render payment by paying through a debit card without presenting the debit card, paying through an intermediary account without authentication for the intermediary account, or paying through a credit card without presenting the credit card.

In yet another aspect, some implementations may provide a computer-implemented method that includes: receiving, at a server and from a mobile device, correlated personal identification information obtained from multiple machine-readable zones (MRZs) of a government-issued identification document, the government-issued identification document being presented at the mobile device to support a request of payment; checking the correlated personal identification information against a system of record; transmitting, by the server and to the mobile device, results of checking to the mobile device based on which the mobile device renders payment in response to the request of payment and with no additional checking.

Implementations may include one or more of the following features. Checking the correlated personal identification information may include checking the correlated personal identification information against the system of record administered by a government entity. Checking the correlated personal identification information may include transmitting, by the server and to the government entity, the correlated personal identification; and receiving, by the server and from the government entity, results of checking the correlated personal identification against the system of record.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DETAILED DESCRIPTION

Mobile devices, such as smart phones, tablets, laptops, special purpose readers or even home desktops, are increasingly used for mobile transactions. Example mobile transactions may include, for example, payment using a credit/debit card, on-line purchase of merchandise, on-line request for Medicare reimbursement, on-line booking of airline ticket or train ticket. Companies, such as Square and Intuit, have offered payment processing devices that attach to smart phones, such as, for example, an iPhone, a Samsung phone, a HTC phone, etc. Although mobile payments may be processed by these payment processing devices, security concerns surrounding such mobile payments remain. For example, stolen or lost credit/debit cards may be abused rather easily within such context of mobile payment.

Existing mechanisms to authenticate the mobile payments are unable to tie the identity of a person to the mode of payment. To address this problem current solutions employ massive registries of good and fraudulent data. The other problem associated with existing mechanisms is that "local" authentication mechanisms based on barcode and magstripe are known to be highly vulnerable. As these existing mechanisms to authenticate the mobile payments tend to render such mobile payments more cumbersome and less convenient, especially for unsophisticated average users. In contrast, system and methods, such as those disclosed in this application, can authenticate mobile payments based on a physical copy of a government-issued identification document. A government-issued identification document, as discussed in this application, may include a driver license, a passport, a permanent resident card, a social security card, a Medicare card, a Medicaid card, etc. The use of these government-issued identification documents is becoming increasingly common in our society. A valid government-issued identification document may be trusted and relied upon for a variety of applications because the holder of this identification document generally has been authenticated or background-checked by the government during the application process. Authenticating a user requesting a mobile transaction by using a validated government-issued identification document may provide a high probability of authenticity with no significant comprise in speed and convenience. As a result, systems and methods as disclosed herein may be well-suited for use by an average and unsophisticated computer user in authenticating herself/himself during a particular mobile transaction.

Figure 1:
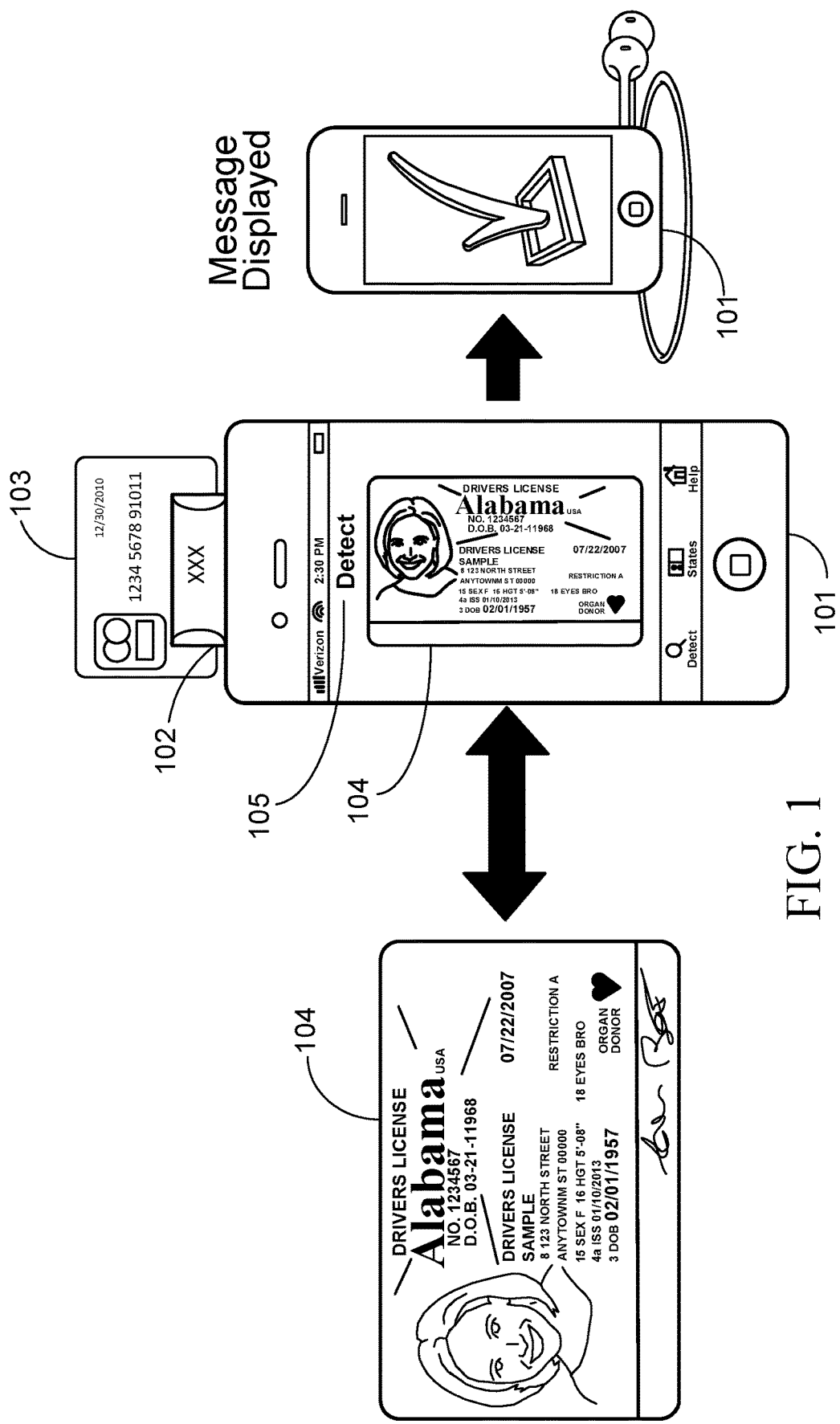
FIG. 1 illustrates an example of a mobile device that authenticates a user requesting a mobile transaction according to some implementations.

FIG. 1 illustrates an example of a mobile device authenticating a user requesting a mobile transaction according to some implementations. Mobile device 101 may include an iPhone, as shown in FIG. 1. Mobile device 101 may also include other smart phones, such as, for example, a Samsung smart phone, a HTC smart phone, an Android smart phone, a Windows smart phone, etc. In addition, mobile device 101 may include a tablet device, for example, an iPad, a Samsung Note device, a Microsoft touch device, etc. Further, mobile device 101 may also include a laptop device, or even a desktop computer at home. Mobile device 101 may receive a request for a mobile transaction, as discussed below.

As illustrated in FIG. 1, the user on mobile device 101 intends to engage in a mobile transaction of making a credit/debit card payment. To this end, payment processing device 102 is mounted on mobile device 101. FIG. 1 shows an Intuit payment processing device for illustration purpose only. Payment processing device 102 may process swipes of credit/debit card 103 by reading the magnetic stripes on credit/debit card 103. Once the credit/debit card has been swiped or read, the information encoded on the magnetic medium of credit/debit card may become available to mobile device 101. The information may include, for example, credit/debit card number, expiration date, holder's name, holder's birth date, holder's residential address, etc. Armed with such information, mobile device 101 is poised to finish off the requested mobile transaction of making the credit/debit card payment. However, the haunting concern of a stolen or lost credit may hinder wider adoption. Without further authentication that the purported user requesting the mobile transaction is the holder of the credit/debit card, a stolen or lost credit/debit card may be easily abused. Examples of spoofing may include reading by unauthorized reader, recording magstripe from an unauthorized source, duplicating the magstripe since it can be easily reproduced Such abuse increases fees due to fraud and theft. Meanwhile, an overly restrictive credit/debit card use policy may lead to improper denials and render the credit/debit card useless.

According to some implementations, the user may present a government-issued identification document to back up the requested mobile transaction. For example, in FIG. 1, the user proceeds by showing her government-issued identification document 104 at detector 105. As illustrated in FIG. 1, government-issued identification document 104 may include a state-issued driver license. Yet, the identification document 104 is not yet authenticated and the holder of the identification document 104 may not be the rightful owner documented by the identification document 104.

Detector 105 may be a digital camera mounted on mobile device 101 (or an integral part of the mobile device 101). In particular, detector 104 may be any sensor device based on existing technology or technology being developed, including, for example, an infrared sensor, a photo scanner, a charge-coupled device (CCD) camera, a complementary metal-oxide-semiconductor (CMOS) active pixel sensor, etc.

The user may present government-issued identification document 104 for inspection by placing government-issued identification document 104 immediately to detector 105 for a close-up view. From the close-up view obtained from detector 104, mobile device 101 may obtain, for example, a digital watermark embedded in the government-issued identification document 104. Upon detecting the integrity of the embedded watermark, government-issued identification document 104 may be deemed genuine and thus validated. The watermark in this case is a like a DNA strand which includes a code linking securely and uniquely the identification document, the issuing agency, and the user.

In addition, mobile device 101 may extract payload data from mobile device 101. Payload data may include, for example, name of the holder, birth date of the holder, residential address of the holder, etc. This payload data may provide personally identifiable information of the user requesting the mobile transaction, for example, the payee of the requested credit/debit card payment, as illustrated in FIG. 1. If the payload data is not available from government-issued identification document 104, then some information, such as name of the holder, birth date of the holder, or residential address of the holder, etc. may be obtained by using optical scanner recognition (OCR) techniques based on a scan of the government-issued identification document 104.

In some implementations, for example, the name of the holder of government-issued identification document 104 can be compared with the name of the holder of credit/debit card 103. If the names match, mobile device 101 may proceed with the requested mobile transaction of payment using credit/debit card 103.

The requested mobile transaction may take place using a video camera on mobile device 101. For example, in some implementations, once government-issued identification document 104 has been validated, the store keeper may visually inspect, through a video link provided by the video camera on mobile device 101, the person requesting the mobile transaction who has presented the validated government-issued identification document 104. If the visual inspection confirms that the person requesting the mobile transaction is the person depicted in his/her government-issued identification document, the store keeper may permit the mobile transaction to proceed. For example, the store keeper may honor the mobile payment as a legitimate purchase payment, mark the merchandize as paid, and allow the person to take possession of the merchandize by arranging shipment or authorizing the release.

The person requesting mobile transaction may be different from the person has presented the validated government-issued identification card. For example, in some implementations, a spouse may be the credit/debit card holder while the other spouse may have presented his/her government-issued identification document. As long as the other spouse is an authorized user of the credit/debit card, the mobile transaction may proceed and her/his documents are respectively authenticated. Additionally and if desired, the mobile device 101 may alert the registered owner of the credit/debit card about the mobile transaction. The alert may be sent through email, automatic voicemail, short message service (SMS) message, etc.

The authorization may be implied, for example, based on a pre-existing legal relationship between the person requesting the mobile transaction and the person identified government-issued identification document. The pre-existing legal relationship may be indicated on the government-issued identification document. Information of the pre-existing legal relationship may be encoded in the media, for example, a magnetic strip, a smart card media, etc., of the government-issued identification document. In addition, the pre-existing legal relationship may be documented on a database maintained by a government entity. The legal relationship may include, for example, a spousal relationship, a guardian-dependent relationship, a trust-beneficiary relationship, etc.

The authorization may also be express. For example, the credit/debit card may encode a list of authorized users. If the user authenticated based on the government-issued identification card is on the list of authorized users, then mobile device 101 may submit the mobile transaction. If the user authenticated based on the government-issued identification card is not on the list of authorized users (or the encoded list has not been updated for a period of time, for example, more than three months), then mobile device 101 may submit the mobile transaction that includes information identifying the authenticated user making the request. The credit/debit card company may maintain an up-to-date list of authorized users and may allow the transaction only if the authenticated user is on the up-to-date list of authorized users. Thereafter, mobile device 101 may alert the registered owner of the credit/debit card about the mobile transaction. However, if the authenticated user is not on the up-to-date list of authorized users, the credit/debit card company may deny the mobile transaction and send an alert to the registered owner regarding the denied mobile transaction. The alert may be sent through, for example, an email, an automatic voicemail, or a simple message service (SMS) message, etc.

Figure 2:
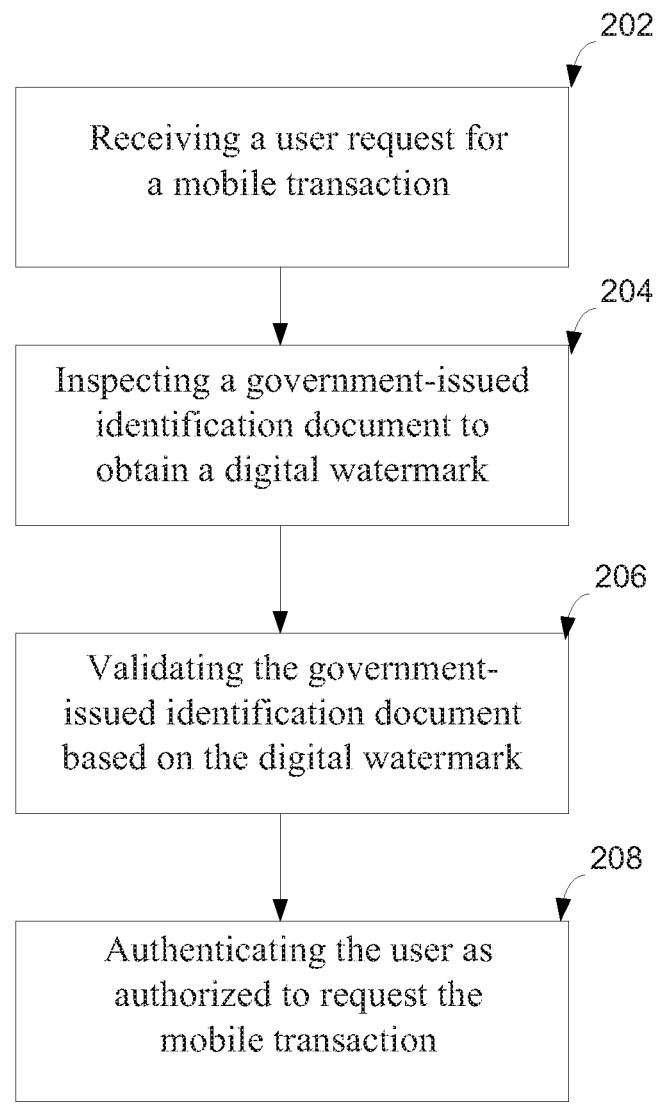
FIG. 2 is a flow chart showing an example of a method for authenticating a user requesting the mobile transaction according to some implementations.

FIG. 2 is a flow chart showing an example of a method for authenticating a user requesting the mobile transaction according to some implementations. First, a user request for a mobile transaction may be received (202). The mobile transaction may be received at mobile device 101 as illustrated in FIG. 1. However, applicable mobile transactions are not limited to a credit/debit card payment as illustrated in FIG. 1. Mobile transactions may also include, for example, a wire transfer of funds, an on-line purchase request, an on-line request for distribution, an on-line request for reimbursement, an on-line request for account access, etc., as will be discussed in association with FIG. 5A.

Second, mobile device 101 may inspect a government-issued identification document 104 to obtain a digital watermark (204). Government-issued identification document 104 may include a state-issued driver license as illustrated in FIG. 1. Government-issued identification document 104 may not be limited to a state-issued driver license, as will be discussed in association with FIG. 5A. Government-issued identification document may include an embedded digital watermark to identify, for example, the legitimate source of the identification document. The digital watermark may be, for example, embedded in the background image of a state-issued driver license or in the portrait of the document holder. The digital watermark may include digital codes embedded into the media of government-issued identification document. The media may include paper, plastic, magnetic media, etc.

Third, based on the digital watermark, the government-issued identification document may be validated (206). The digital watermark may be generally imperceptible to naked eyes. In fact, the digital watermark may generally appear as noise, for example, added to a background noise. However, the digital watermark can uniquely validate and authenticate the government-issued identification document and carry information about the identity of the holder. Altering a digital watermark may be virtually impossible, and the mere lack of presence of a digital watermark can immediately indicate tampering and likely counterfeiting. Hence, digital watermarks used in a government-issued identification document may provide strong and effective deterrence to counterfeit. In addition, in granting a government-issued identification document, the government generally has conducted a background check of the applicant and verified the applicant's identity according to an established and elaborate protocol. Because of the inherent government authority in granting and issuing the government-issued identification document, possession of a valid government-issued identification document may establish strong proof of the identity of the document holder.

Figure 3:
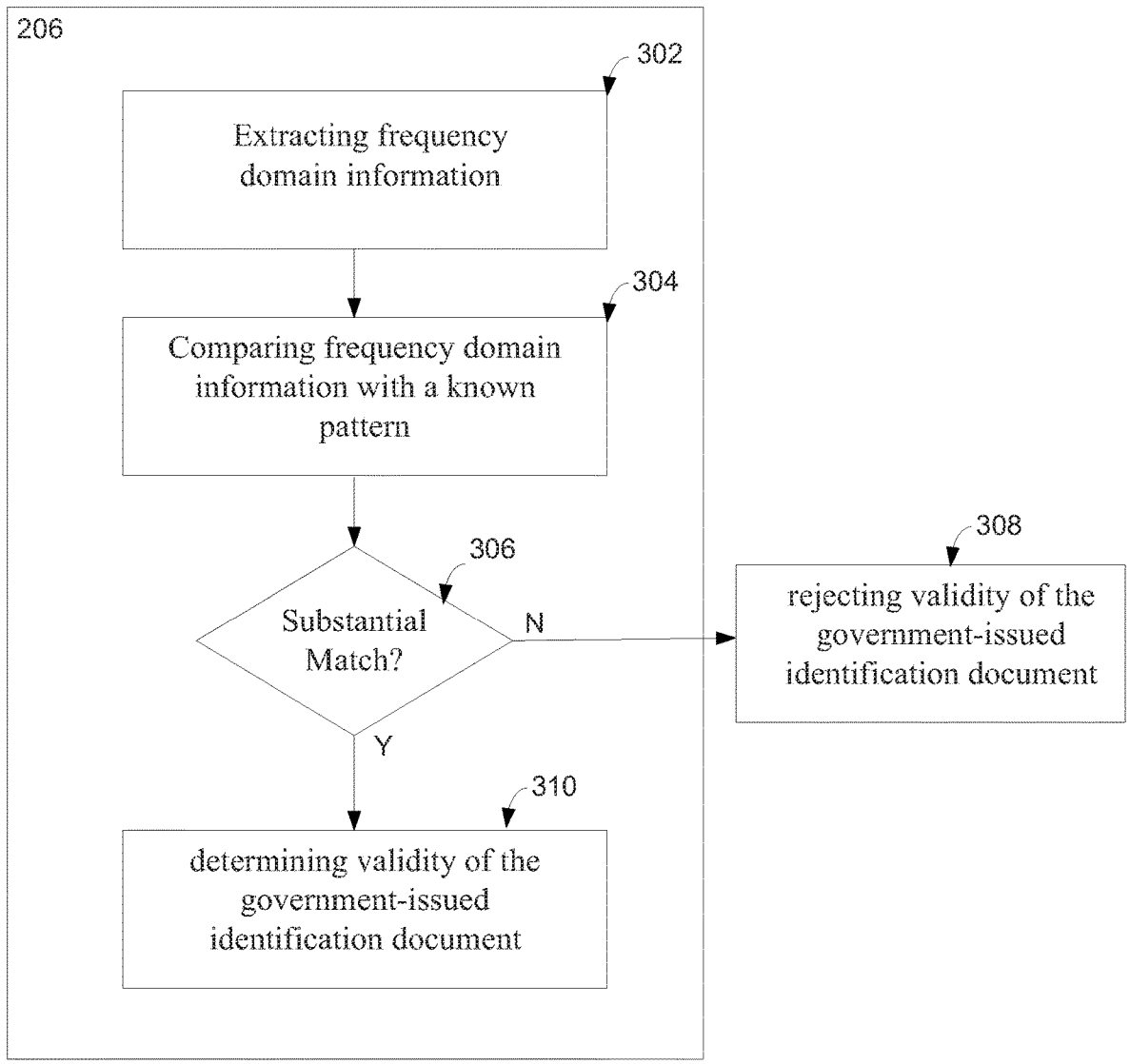
FIG. 3 is a flow chart showing an example of a validation method according to some implementations.

Digital watermarking is secure, covert and machine-readable. To validate the government-issued identification document, the digital watermark may be analyzed according to an example method as illustrated in FIG. 3. Specifically, steganography may analyze the digital watermark and reveal the information identifying the holder. In addition, data contents encoded by the digital watermarks may be encrypted so that the encoded data contents may remain secure, as an additional security mechanism. In some implementations, the digital watermark may be initially analyzed to extract frequency domain information (302). The frequency domain information may include spectrum information manifested by, for example, the digital cosine transform (DCT) coefficients in a particular spatial frequency range. In contrast to spatial domain information, such frequency domain information may be robust to cropping or translation of the original document. Hence, the frequency domain information may be more tamper-proof and more resilient to artifacts during field use. Likewise, mixed-domain information, i.e., information from both spatial domain and frequency domain may provide similar degree of robustness against tampering and artifacts. However, the implementations disclosed herein are not limited to the use of frequency domain information alone or the use of mixed-domain information. Spatial domain information may be used according to the same scheme as disclosed herein.

The frequency domain information may encode a pattern for validation purposes. The pattern may be chosen by the issuing authority and remain secretive to the outside world, and only, to validate the government-issued identification document, the frequency domain information may be compared with the known pattern (304). In some implementations, the comparison may be performed locally at mobile device 101. In some implementations, mobile device 101 may send the extracted frequency domain information to a central server for the comparison. Details of the different architectures are provided in association with FIG. 5B.

The comparison may determine whether there is a substantial match between the extracted frequency domain information and the known pattern (306). The extracted frequency domain information does not have to perfectly match the known pattern. In some implementations, for example, the frequency domain information may be incomplete due to losses in the scanning process. In some implementations, the degree of match may depend on the context of the application. For example, for applications involving mobile transactions with a financial sum of under $500, a lower degree of match authentication level may be sufficient. While for applications involving mobile transactions regarding, for example, any purchase of controlled substances, a higher degree of match may be adopted. In some implementations, the matching process may depend on jurisdiction. For example, in some states which adopted a less sophisticated digital watermark, a more primitive match procedure may be performed. Even in states that have adopted a more sophisticated digital watermark, legacy identification cards may still use the old and less sophisticated digital watermarking. These legacy identification cards may still be honored by a more primitive matching procedure. In some implementations, ascertaining whether there is a substantial match may further factor in prior dealings between the person requesting the mobile transaction and the holder of the government-issued identification document. For example, if the person requesting the mobile transaction has been paying for the holder of the government-issued identification document frequently in the past, then the degree of match may be lessened to simplify the process. A trusted consumer database can be set up if needed.

If substantial match has been found between the extracted frequency domain information and the pattern, mobile device 101 may authenticate the government-issued identification document (310). Conversely, if substantial match has not been found between the extracted frequency domain information and the pattern, mobile device 101 may reject the validity of the government-issued identification document. In some implementations, the mobile device may alert the holder of the government-issued identification document of the rejection. The mobile device could also ask for another valid form of identification and, an alert may be sent through email, automatic voicemail, short message service (SMS) message, etc.

When government-issued identification document has been validated, mobile device 101 may read information of the holder encoded in the document. The information may include, for example, name, gender, age, birth date, residential address, telephone number, or physical characteristics of the holder, etc. Example physical characteristics may include height, weight, hair color, eye color, etc. Such information may be encoded in a magnetic stripe or barcode. In some implementations, mobile device may simply scan the document and extract such information by, for example, OCR techniques.

Returning to FIG. 2, the information of the holder may be used to authenticate that the user requesting the mobile transaction is the person authorized to request the mobile transaction (208). The authentication may compare the information of the holder with data associated with the person requesting the mobile transaction. The data of the user requesting the mobile transaction may include, for example, the name, age, gender, or residential address of the requester. Such data may be obtained, for example, from the mobile transaction request itself. In the example of credit/debit card payment as illustrated in FIG. 1, the data may be read from credit/debit card 103 by card reader 102.

Figure 4A:
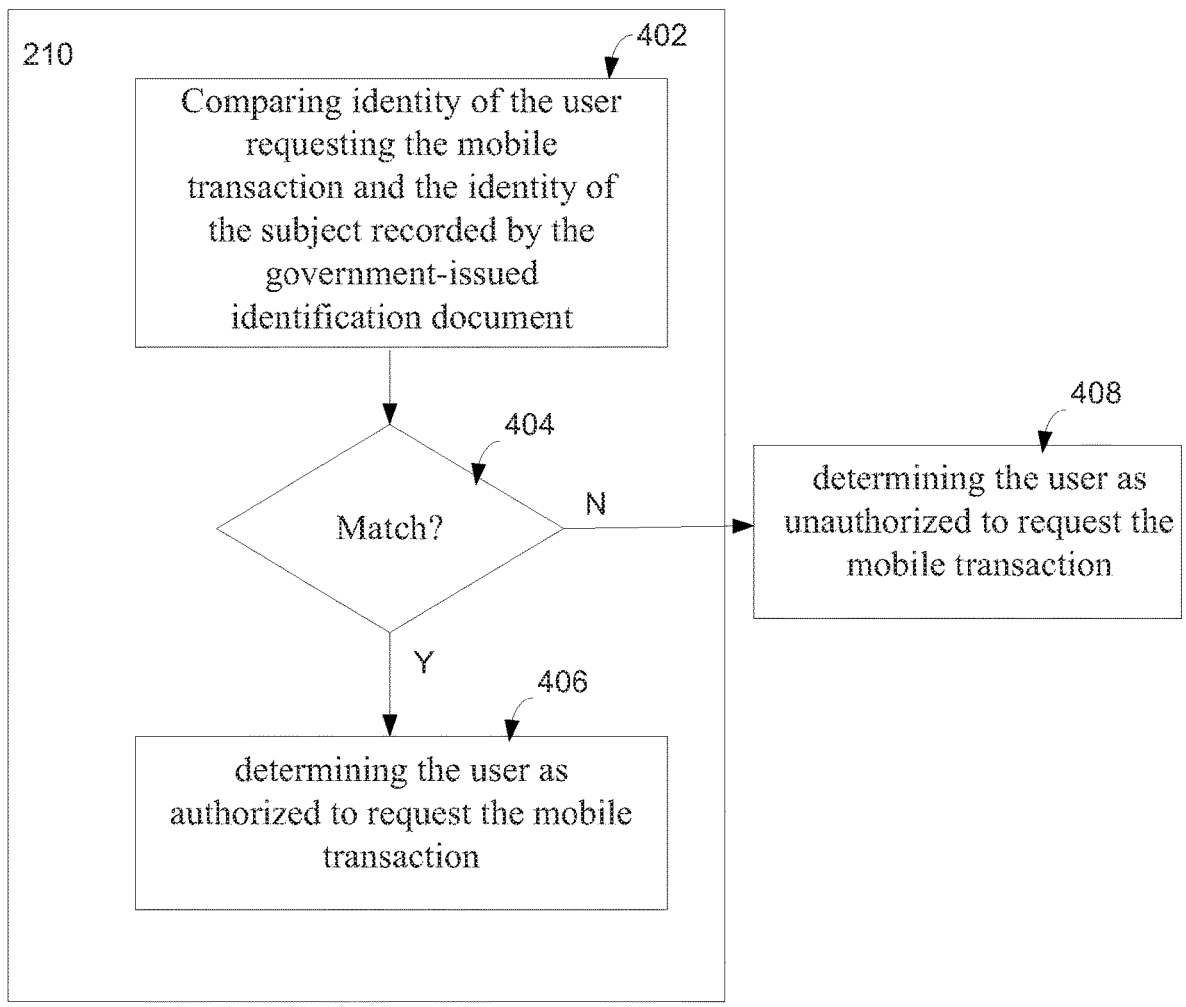
FIG. 4A is a flow chart showing an example of an authentication method according to some implementations.
Figure 4B:
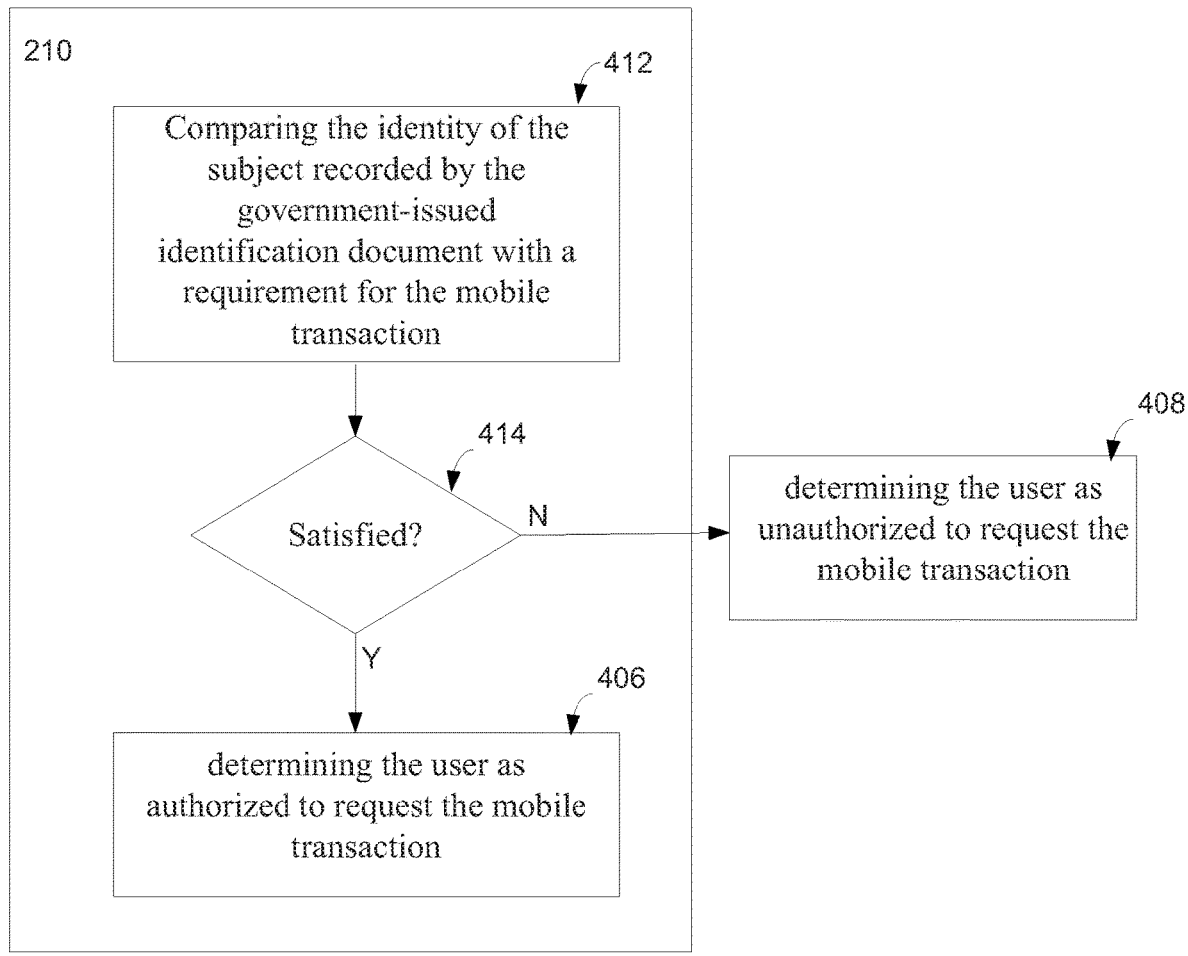
FIG. 4B is a flow chart showing another example of an authentication method according to some implementations.

Example authentication processes according to some implementations are illustrated in FIGS. 4A and 4B. Referring to FIG. 4A, an example authentication method may initiate by comparing the identity of the user requesting the mobile transaction and the identity of the subject issued by the government according to the identification document (402). The identity may include at least one of: a name, an age, a birth date, a residential address, or a sequence number. The sequence number may include, for example, a social security number, a driver license number, a veteran number, a passport number, an alien registration number, etc.

Mobile device 101 may ascertain whether there is a match between the identity of the user making the request for the mobile transaction and the identity of the subject issued by the government as documented by the identification document (404). At no time is the personally identifiable information of the user stored or held for future use. In the context of matching one identity to another identity, the match may be exact when comparing two numeric values while the match may be case insensitive when comparing two character strings (such as names) or alpha-numeric strings (such as addresses). The degree of match may also depend on the underlying mobile transaction. If the underlying mobile transaction involves a financial sum of over $500 or a purchase of any controlled substances, the degree of match may be high. Conversely, if the underlying mobile transaction involves a petite sum (for example, a financial sum of under $50), the degree of match may be lessened.

If mobile device 101 identifies a match between the identity of the user making the request for the mobile transaction and the identity of the subjected issued by the government as documented by identification document, mobile device 101 may determine that the user is authorized to request the mobile transaction (406). However, if mobile device 101 fails to identify a match between the identity of the user making the request for the mobile transaction and the identity of the subjected recorded by the government-issued identification document, mobile device 101 may determine that the user is not authorized to request the mobile transaction (408). If it is a legitimate error the user will be prompted to present another valid proof of ID. As discussed above, in some implementations, depending on the legal relationship between the user making the request for the mobile transaction and the person presenting the government-issued identification document, mobile device may still authorize the requested mobile transaction to proceed, if, for example, the user requesting the mobile transaction has been authorized by the holder of the government-issued identification document.

Referring to FIG. 4B, another example authentication method may initiate by comparing the identity of the subject issued by the government as documented by identification document with a requirement for the mobile transaction (412). In some implementations, the identity of the subject issued by the government may be checked for the age, the residential address, etc. to comply with legal requirements for engaging in the requested mobile transaction. For example, the legal drinking age may be the requirement for the requested mobile transaction of purchasing liquor, alcohol, or wine products. Based on the context, the legal drinking age in the jurisdiction where the mobile transaction is placed and the legal drinking age in the jurisdiction where the on-line vendor is located may be different. Both legal requirements may be included. The legal age for requesting social security distribution may be another example requirement. For example, different jurisdiction may impose varying restrictions on on-line purchase requests and therefore the residential address or residential history may be yet another example requirement.

Mobile device 101 may ascertain whether the identity of the subject issued by the government satisfies the requirement for the mobile transaction (414). In the case of multiple legal requirements, mobile device 101 may ascertain whether all such legal requirements are satisfied.

If the identity of the subject issued by the government as documented by identification document satisfies the requirement for the mobile transaction, mobile device 101 may determine that the user is authorized to request the mobile transaction (406). However, if the identity of the subject issued by the government as documented by the identification document does not satisfy the requirement for the mobile transaction, mobile device 101 may determine that the user is not authorized to request the mobile transaction (408). As discussed above, in some implementations, depending on the legal relationship between the user making the request for the mobile transaction and the person presenting the government-issued identification document, mobile device may still authorize the requested mobile transaction to proceed, if, for example, the user requesting the mobile transaction is the beneficiary of the holder of the government-issued identification document.

Figure 5A:
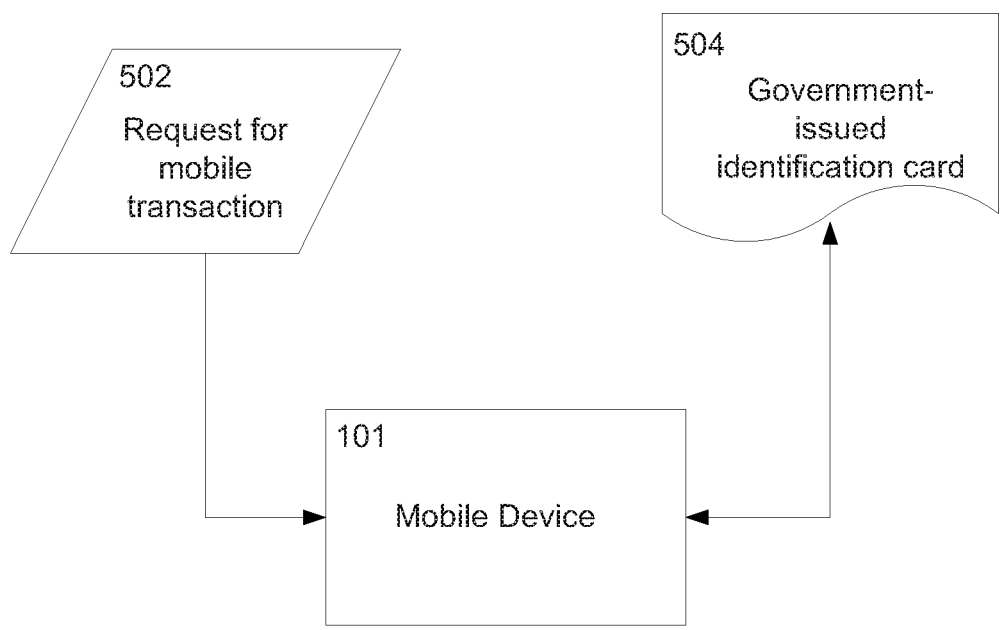
FIG. 5A illustrates an example of a mobile device authenticating a request by using a government-issued identification document.

FIG. 5A illustrates an example of a mobile device authenticating a request by using a government-issued identification document. Upon receiving a request for a mobile transaction (502), mobile device 101 may expect a credential to back up the request. The credential may come in the form of a government-issued identification card 504. In some implementations, mobile device 101 may prompt the user of mobile device 101 to present his or her government-issued identification card 504. In some implementations, the user of mobile device 101 may present his or her government-issued identification card 504 without being prompted by mobile device 101.

The request for mobile transaction 502 may include a request for a credit/debit card payment, a request for a wire transfer of funds, an on-line purchase request, an on-line request for distribution, an on-line request for reimbursement, an on-line request for account access, etc.

A wire transfer may allow the requester to transfer funds in one account to another account, for example, in a different bank in a different locale or country. The wire transfer request may also include requests to fund an on-line stock or stock option purchase through a checking account, a savings account, etc.

An on-line purchase request may include a purchase request for a special item The purchase request may be at a point of service when a customer comes in person to collect a controlled item for which the customer needs to be vetted before collecting the controlled items. The special item or controlled item may include, for example, alcohol, liquor, wine, small arms, ammunitions, over-the-counter (OTC) drugs that may contain controlled substances etc. Controlled substances may include any substances that falls under the Controlled Substances Act. Additionally, the special item may also include certain electronics equipment and accessories that may be used for surveillance or eavesdropping.

An on-line request for distribution may include a request for a distribution of social security benefits, a retirement plan distribution, a pension plan distribution etc.

An on-line request for reimbursement may include a request for reimbursement of medicare benefits, Medicaid benefits, or a state-sponsored health care plan such as, for example, MediCal in the state of California. The on-line request for reimbursement may additionally include a request for private insurance reimbursement for health care expenses, property repair expenses for auto or home, etc.

An on-line request for account access may include a request to change any information in an on-line account, such as, for example, an on-line EZ-pass account, an on-line individual Department of Motor Vehicle (DMV) account, an on-line bank account, an on-line credit/debit card account, etc. The on-line request for account access may also include a request for payment through an intermediary, such as a PayPal account, a BillMeLater account, a GoolgleWallet account, etc.

Government-issued identification card 504 may include a state-issued driver license, a passport issued by the State Department, a permanent resident card issued by the Unites States Citizenship and Naturalization Service (USCIS), a naturalization certificate issued by the USCIS, a social security card issued by the social security service, a Medicare card issued by the Department of Human and Health Services (DHHS), a Medicaid card issued by the DHHS. Government-issued identification document may additionally include a national identification card, as used in countries in Europe, Asia, and Latin America. Government-issued identification document may also include a state-issued Medicare card, such as the Medical card issued by the state of California, etc.

Figure 5B:
FIGS. 5B-D illustrate various examples in which a mobile device validates a government-issued identification document.
Figure 5C:
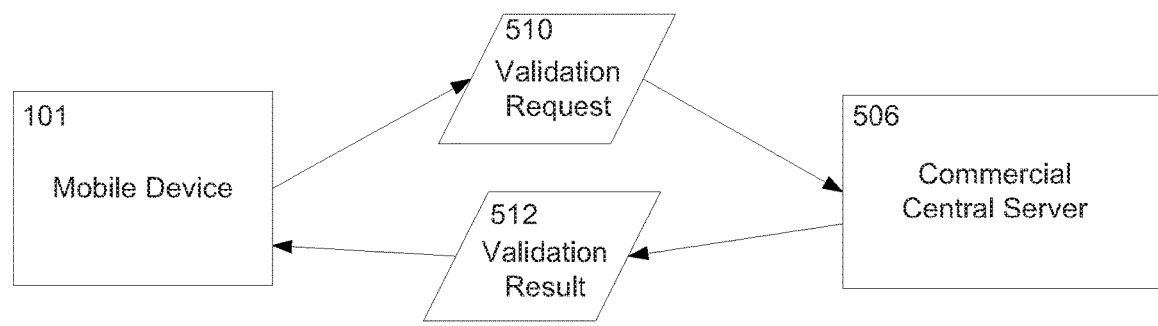
Figure 5D:
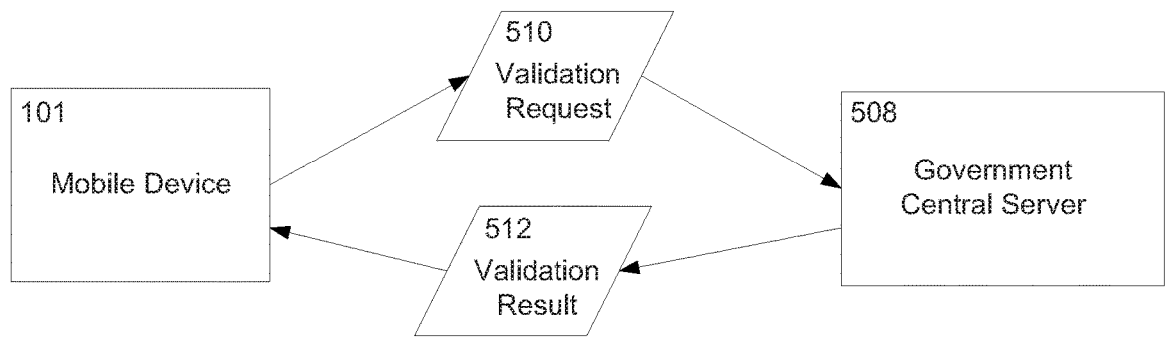

FIGS. 5B-D illustrate various examples in which a mobile device validates a government-issued identification document. Once presented with the government-issued identification document, mobile device 101 may validate the identification card locally on-site, as shown in FIG. 5B. The on-site validation may be based on the digital watermark as discussed above.

Referring to FIG. 5C, in some implementations, mobile device 101 may transmit information encoding the digital watermark to commercial central server 506. The information encoding the digital watermark may be transmitted along with a validation request 501 to commercial central server 506. Commercial central server 506 may house a database for validating digital watermark. The validation may be based a comparison of frequency-domain information or mixed-domain information, as outlined above. Frequency domain information may be more robust than spatial domain information for being more tamper-proof and resilient to errors (for example, due to cropping or zooming). However, the implementations disclosed herein are not limited to frequency-domain information or mixed-domain information and can be applied to spatial-domain information. When commercial central server 506 finishes the validation, commercial central server 506 may transmit validation request 512 back to mobile device 101. Thereafter, mobile device 101 may act accordingly based on the contents of validation result 512, as discussed above.

Referring to FIG. 5D, in some implementations, mobile device 101 may transmit information encoding the digital watermark to government central server 508. The information encoding the digital watermark may be transmitted along with a validation request 501 to government central server 508. Digital watermarking may also work across jurisdictions, from federal to state or from state to state. As the issuer of government-issued identification document 504, government central server 508 may house a database of raw information for validating digital watermark. Government central server 508 may be administered by the issuing agency directly, or through a proxy, including, for example, a third-party independent contractor. In some implementations, commercial central server may transmit additional validation request to government central server 508 for final resolution of a validation request originally sent from mobile device 101.

In some implementations, the paradigm of authentication can be used without a tie to a database. In some implementations, the authentication can also be used in relation to a database if so desired. Authentication solutions to address on-line fraud or identity theft may incorporate sophisticated software mechanisms. Such authentication solutions may be cumbersome and less user-friendly, especially an average and unsophisticated user. In contrast, government-issued identification documents are becoming more acceptable in that they are used by people from all walks of life. In addition, government-issued identification document carries the authentication digital watermark issued by the government and tend to be self-authenticating. Moreover, before a government-issued identification document is issued, an elaborate verification process has been performed by the government to confirm that the applicant is who he or she purports to be and that the information provided by the applicant is accurate and complete, as of the application date. As disclosed herein, these features of a government-issued identification document may be incorporated by a mobile device to authenticate that a user requesting a mobile transaction is authorized to request the mobile transaction. The resulting authentication method addresses on-line fraud and identity theft issues with no significant compromise in convenience and ease of use. The resulting authentication method may be readily implemented on a variety of mobile devices, such as, for example, a smart phone, a tablet device, a laptop device, or even a home desktop computer.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The use of the digital watermark is stateless. During an implemented method, the personally identifiable information of the user stored or held is not stored for future use.

Figure 6:
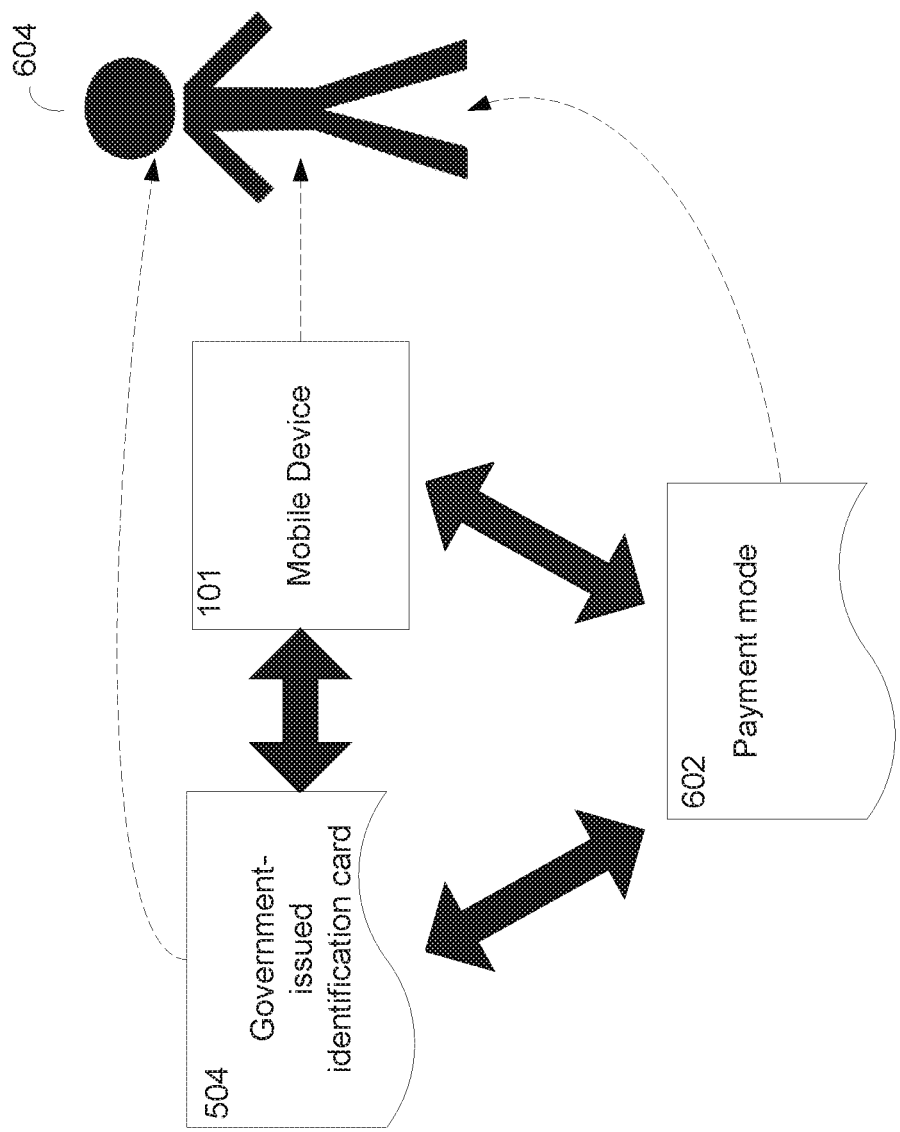
FIG. 6 illustrates an example of a mobile device configured to associate government-issued identification card with a mode of payment.

FIG. 6 illustrates an example of a mobile device 101 configured to associate government-issued identification card with a mode of payment. A government-issued identification card 504 may be associated with payment mode 602 on mobile device 101. The government-issued identification card may be registered at the mobile device 101 as a credential for accessing payment mode 602 on mobile device 101. For example, the government-issued identification card of user 604 may be registered at the mobile device by virtue that user 604 is the registered owner of the mobile device. The government-issued identification card of user 604 may also be registered by configuring user 604 as an authorized user for accessing payment mode 602.

Payment mode 604 may be any mode of on-line payment, including, for example, a credit card payment, a debit card payment, a payment through an intermediary account. Example intermediary accounts may include: a pay-pal account, a BillMeLater account, a Google wallet account, etc. Under payment mode 604, funds from an account may be drawn to render payment on-line. The account may be owned by the same user as identified by the government-issued identification card. The account may also be owned by a user different from the subject identified by the government-issued identification card. When the user who owns the account is different from the subject identified by the government-issued identification card, the subject may be an authorized user of the account. The authorized user may be, for example, a relative, a employee, an agent, or a friend of the owner of the account.

Government-issued identification card 504 and payment mode 502 may be linked at the mobile device 101. The linking may enable the use of government-issued identification card 504 to support payment under payment mode 602 on mobile device 101.

Figure 7:
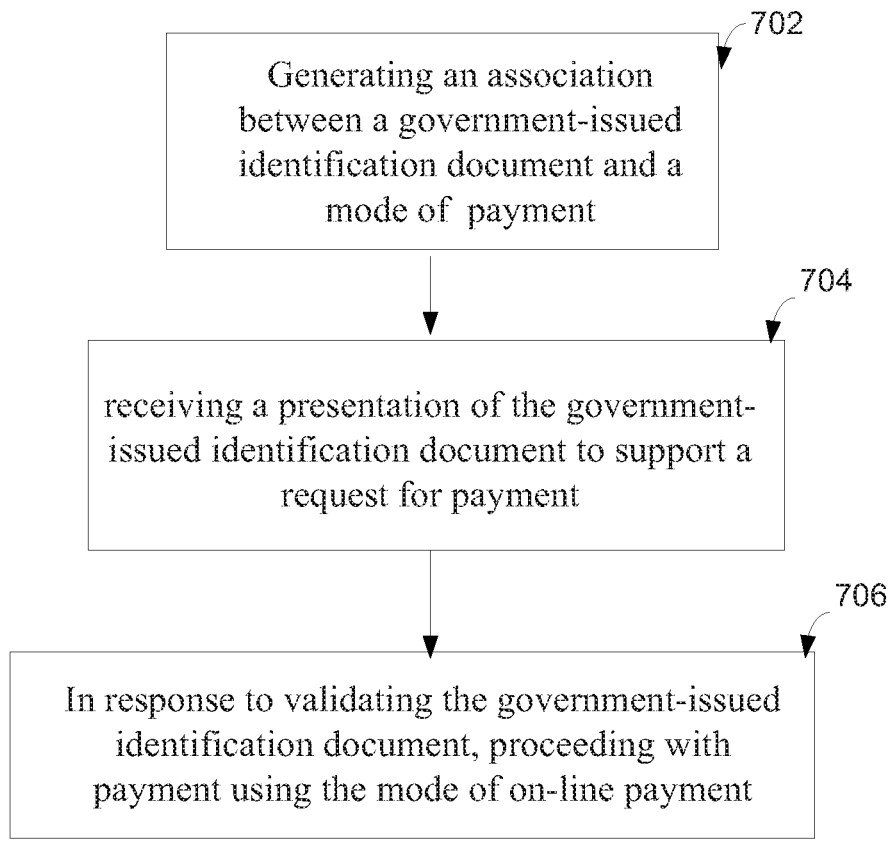
FIG. 7 is a flow chart showing an example of a method of using a government-issued identification document to support an on-line payment in response to a request for payment.

FIG. 7 is a flow chart showing an example of a method of using a government-issued identification document to support an on-line payment in response to a request for payment. The method may initiate by generating an association between a government-issued identification document with a mode of payment (702). The government-issued identification document may be an identification card, a driver's license, a passport, etc. A payment mode may be any on-line payment mode. The association may be an indirect association through a mobile device 101. The association may enable using government-issued identification document as a credential to render payment. Moreover, the association may enable the use of government-issued identification document to support rendering the payment without additional credentials Then, the method may proceed by generating receiving a presentation of the government-issued identification document at the mobile device to support a request for payment (704). For example, the mobile device may capture an image of the presented government-issued identification document. Thereafter, the image may be analyzed to extract frequency domain information encoding a digital watermark. The digital watermark may be used as a basis to validate the presented government-issued identification document, as discussed above.

Thereafter, in response to validating the government-issued identification document, the method may proceed by rendering payment using the mode of payment associated with the government-issued identification document (706). Thus, the government-issued identification document may be used as a credential to respond to a payment request on mobile device. In particular, government-issued identification document may be used to support rendering the payment without additional credentials from the user making the request for payment. Example additional credentials may include: presentation of the credit card or debit card such as swiping the credit card or the debit card; providing personal identification number (PIN) associated with the credit card account or the debit card account; providing a security code associated with the credit card or the debit card; providing the password associated with the credit card account, the debit card account, or the intermediary account; answering security questions associated with the credit card account, the debit card account, or the intermediary account, etc. The security code associated with the credit card or the debit card may also be known as the card verification value code.

Figure 8A:
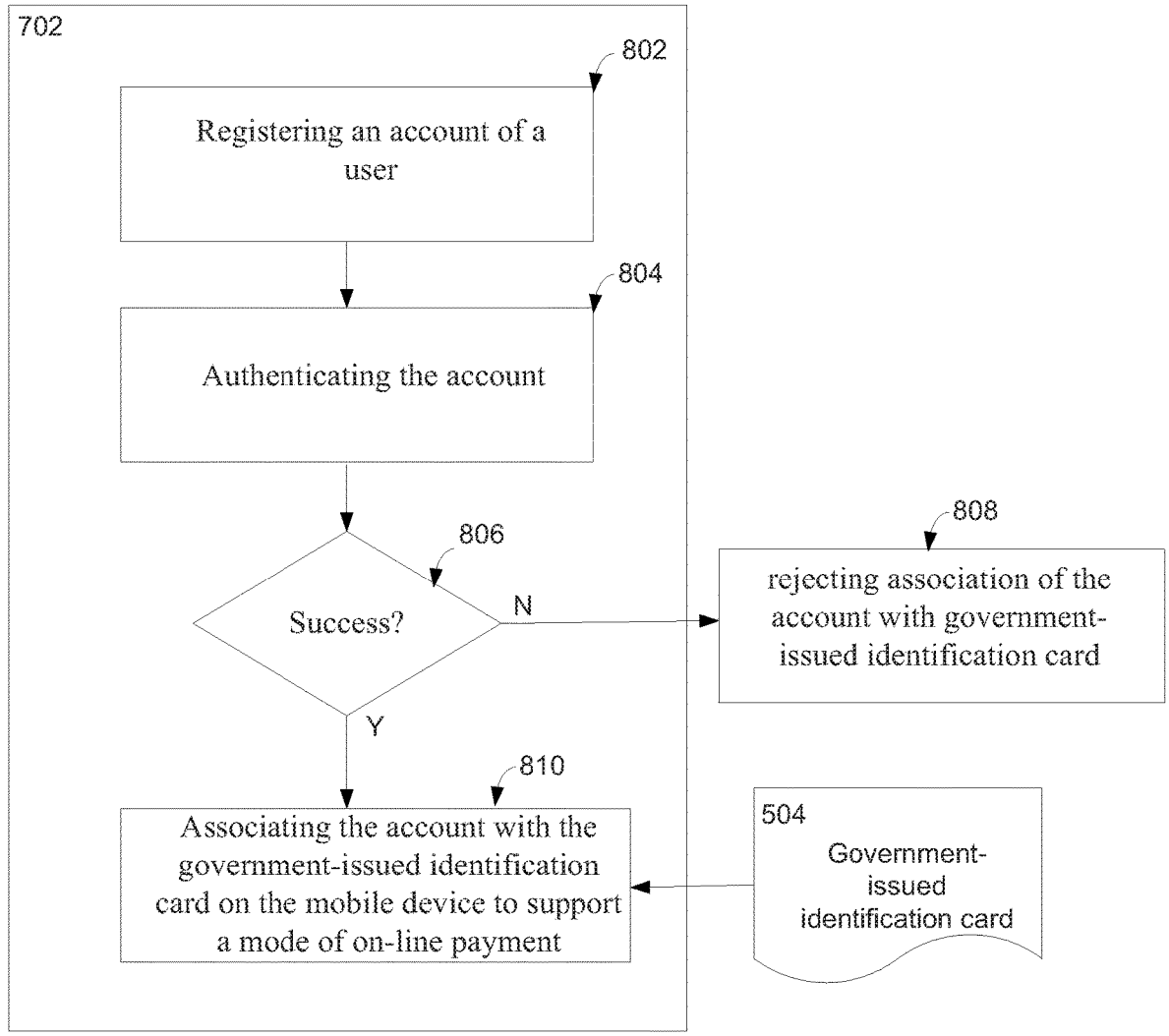
FIG. 8A is a flow chart showing an example of associating an account of a user with a government-issued identification document on a mobile device.

FIG. 8A is a flow chart showing an example of associating an account of a user with a government-issued identification document on a mobile device. An example method may initiate by registering an account of the user (802). The account may be an on-line account including, for example, a credit card account, a debit card account, an intermediary account. The credit card may be associated with any vendors including, for example, Visa, MasterCard, American Express, Discover, etc. The debit card account may be associated with any financial institutions, such as banks, credit unions, etc. The intermediary account may be an account to transfer funds from a credit card account or a debit card account to a different credit card account or different debit account. Example intermediary accounts may include: a PayPal account. BillMeLater account, or a GoogleWallet account, etc. Registration may include signing up the account to be used for rending payment on a mobile device. The registration may enable using a government-issued identification document as a credential document on the mobile device to render payment from the account.

The method may then proceed by authenticating the account (804). The authenticating may include requesting password or security code for accessing the account on-line. The authenticating may include depositing a small sum of money in the account and requesting the user the confirm the sum of money that has been deposited. Because the small sum may be a random number, confirming the small sum deposited may indicate that the correct account has been accessed. The authenticating may include a subsequent withdrawing the small sum of money. Similarly, the authenticating may include withdrawing a small sum of money in the account and requesting the user the confirm the sum of money that has been withdrawn. The authenticating may include a subsequent depositing of the withdrawn sum.

The method may then check the success status of the authentication (806). If the authentication is not successful, the account may be rejected on the mobile device as an account to be associated with the government-issued identification card (808).

If the authentication is successful, the method may proceed by associating the account with the government-issued identification card on the mobile device to support a mode of on-line payment. The association may enable the government-issued identification card to be used as a credential for rendering payment on-line. The government-issued identification card of a user may be registered at the mobile device by virtue that the user is the registered owner of the mobile device. The government-issued identification card of user 604 may also be registered by configuring user 604 as an authorized user for the on-line account.

Figure 8B:
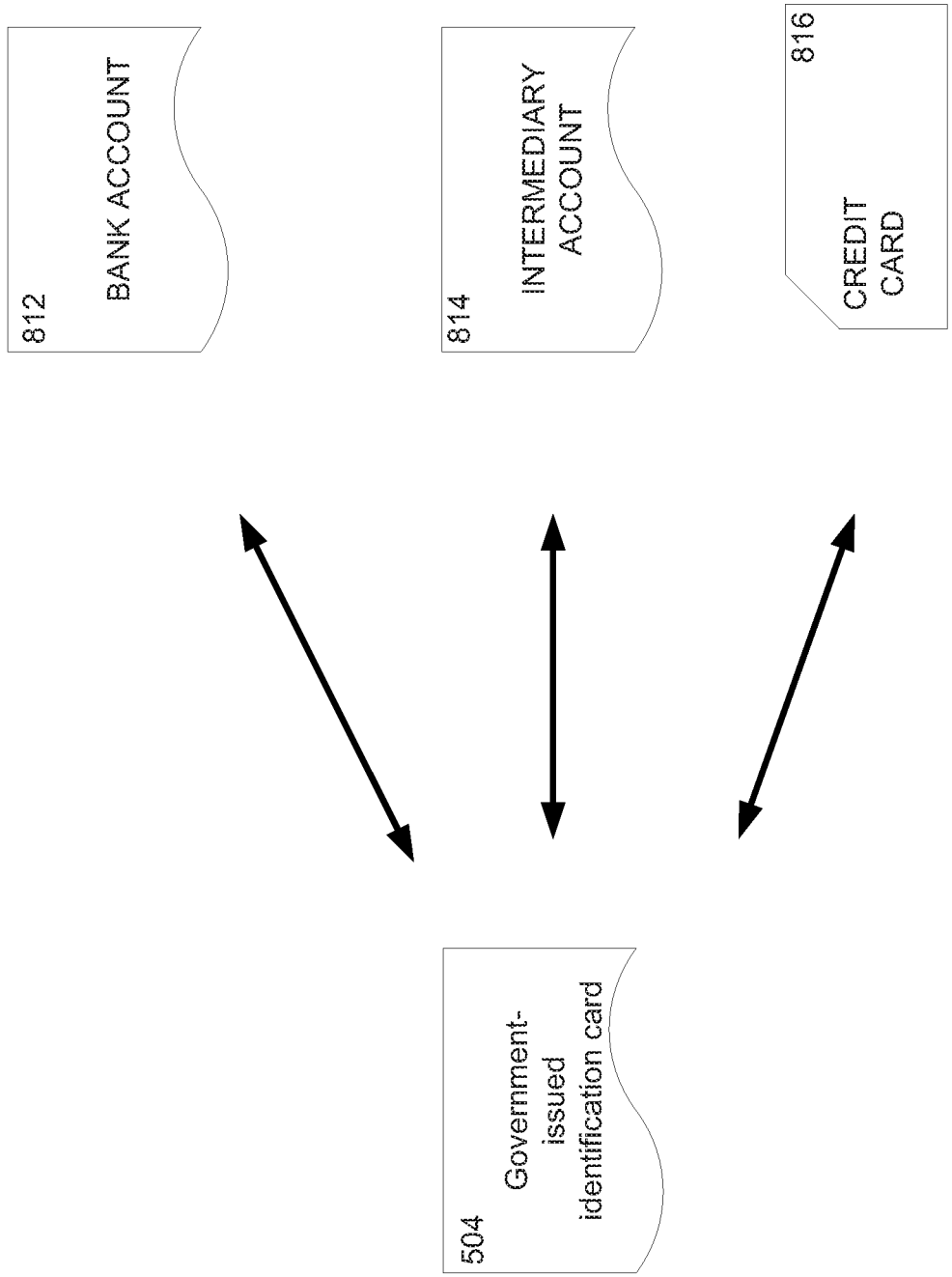
FIG. 8B illustrates a government-issued identification document associated with example accounts, as configured on a mobile device.

FIG. 8B illustrates a government-issued identification document being associated with example accounts, as configured on a mobile device. In particular, government-issued identification card 504 may be associated with a bank account 812, an intermediary account 814, and a credit card 816. The association may allow government-issued identification card 504 to be used as a credential to satisfy an authentication factor before access to bank account 812, intermediary account 814, and credit card 816 can be granted. Bank account 812, intermediary account 814, and credit card 816 may then provide funds meet an on-line payment request that is backed by the government-issued identification document.

Figure 9A:
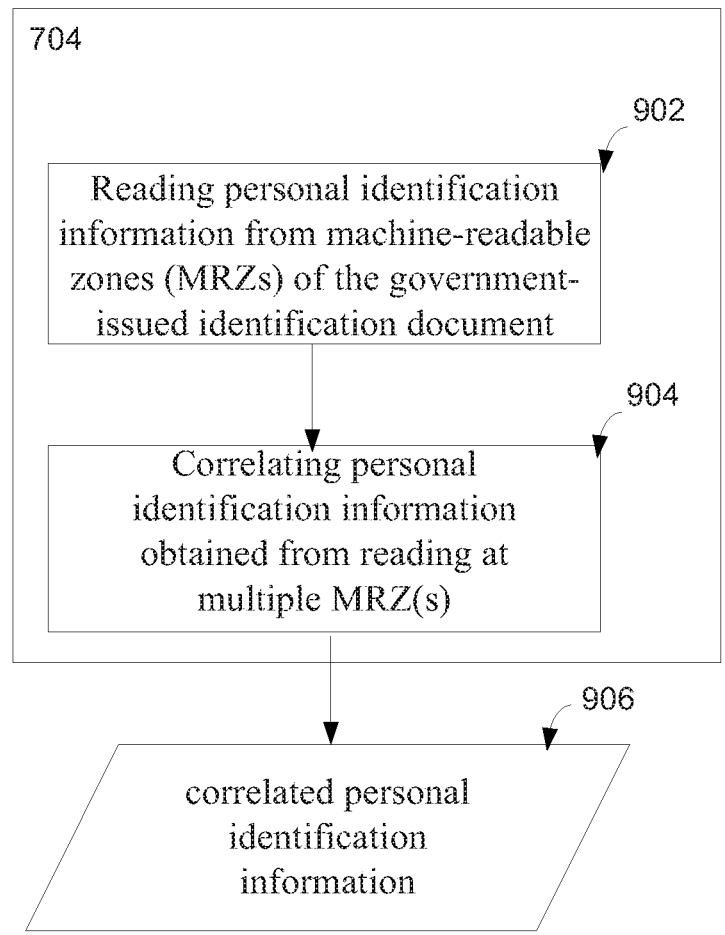
FIG. 9A is a flow chart showing an example of extracting correlated personal identification information from a government-issued identification document.

FIG. 9A is a flow chart showing an example of extracting correlated personal identification information from a government-issued identification document. First, personal identification information may be read from multiple machine-readable zones (MRZs) of the government-issued identification document (902). Personal identification information (PII) may be any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information may include name, address, date of birth, residential address, occupation, marital status, eye color, hair color, height, weight, blood type, etc. Machine readable zones may refer to an area on the identity page of a government-issued identification document. For example, on a passport, the MRZ may be at the bottom of the identity page and may span two lines and each line may be 44 characters long. Example information provided in the MRZ of a passport may include name, document number, nationality, date of birth, sex, document expiration date and personal identity number. Multiple MRZs may be present on the government-issued identification document. Each MRZ may encode complimentary or redundant information using various underlying materials or technologies. Example technologies may including embedding digital watermark in frequency domain information on the printed media, laser irradiation on the substrate material to encode information, etc.

The personal identification information (PII) obtained from readings from multiple MRZs may be correlated (904). The correlation may be performed by comparing the PII from each MRZ. The correlation may depend on the quality of the readout, which in turn may hinge on the wear-and-tear of the government-issued identification document. The correlation may also depend on the level of embedding of the PII in each MRZ by the jurisdictional authority issuing the identification document. Some jurisdictions may implement more sophisticated identification document with improved complimentary readout from the MRZs. Within the same jurisdiction, however, more recently issued identification document may have more sophisticated MRZ implementations. Correlation result may be the correlated PII (906).

Figure 9B:
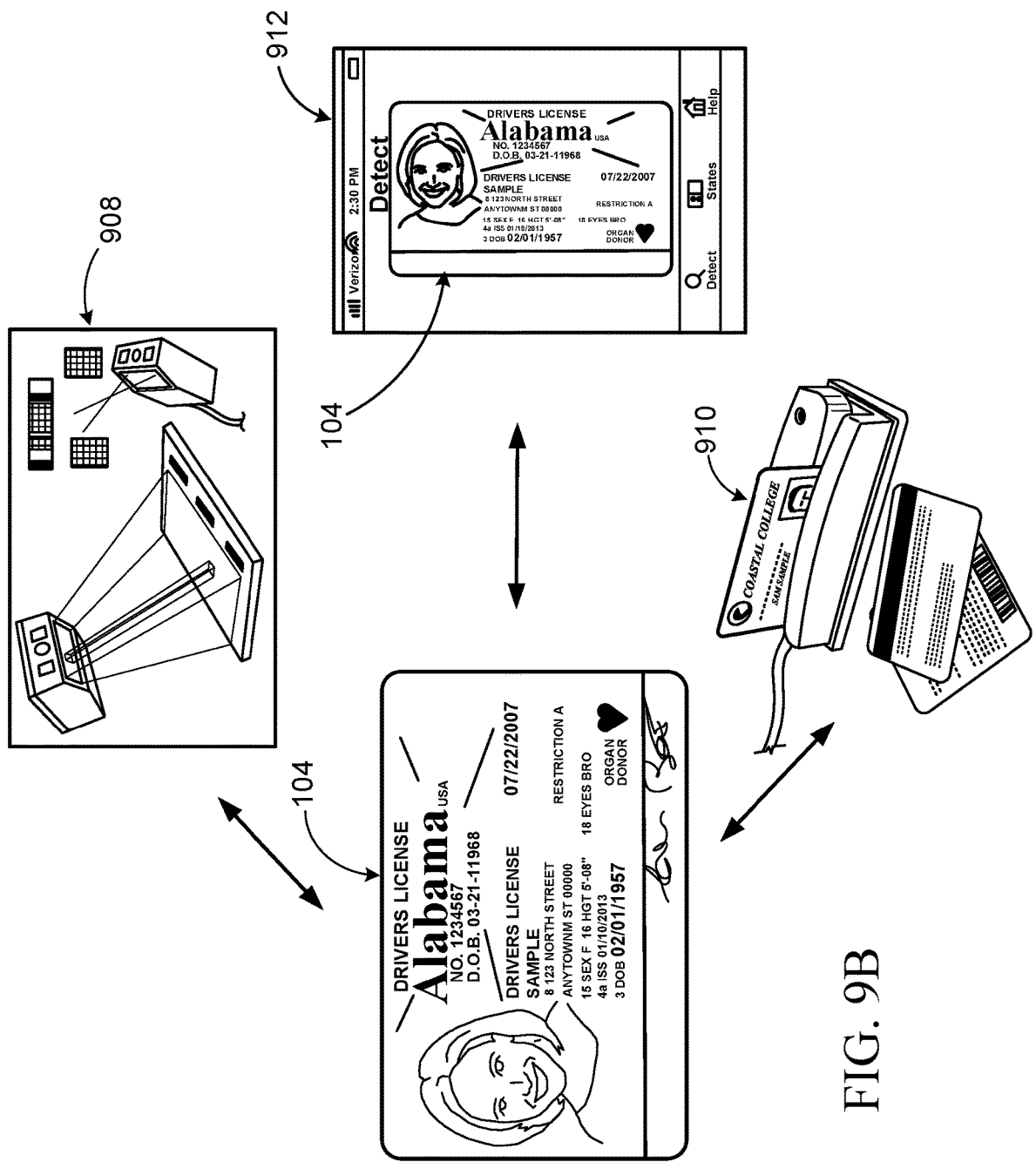
FIG. 9B illustrates extracting correlated personal identification information by reading from multiple zones on the government-issued identification document.

FIG. 9B illustrates reading from multiple readable zones (MRZs) of the government-issued identification document. The identification document 104 may include a MRZ with a printed bar code, a QR code, or other symbology code. The MRZ may also include printed microtext, digital watermark embedded as frequency domain information associated with Moire's patterns, etc. The MRZ may be scanned optically (908) by infrared-laser (e.g., at 1060 nm wavelength), by visible light, etc.

The identification document 104 may also include a MRZ corresponding to a magnetic stripe. PII in this MRZ may be encoded on the magnetic stripe. The encoded PII may be readable by a swiping the identification document on a magnetic reader (910). The encoded PII may not be visible and may stay hidden from plain view. In other words, this encoded PII may be covert.

The identification document 104 may additionally include a MRZ with a portrait of the holder to whom the identification document has been issued by government authority. The MRZ may also include printed text indicating license number, date of birth, expiration date of the identification document, full name of the holder, residential address of the holder, gender, height, weight, hair color, eye color, race, etc. PII in this MRZ may be read by facial recognition technology in combination with optical character recognition (OCR) technology (912).

The information read from multiple MRZs may be compared against each other. For example, the name on the identification document may be compared against the PII encoded on the magnetic stripe or in the digital watermark. The comparison may indicate whether the identification document has been tampered after issuance. Additionally, the information read from multiple MRZs may also supplement each other to build a more comprehensive listing of correlated information.

Figure 10:
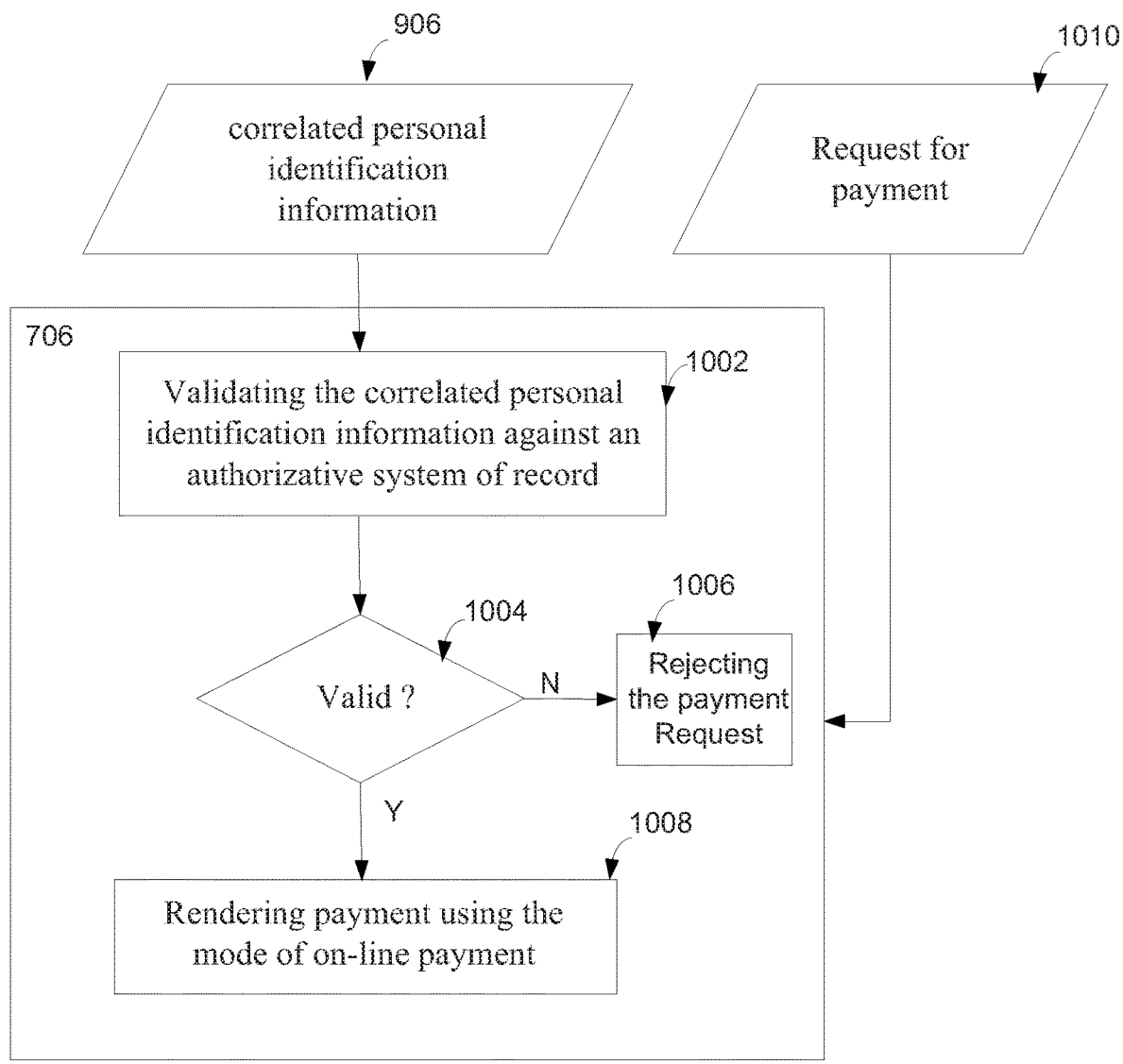
FIG. 10 is a flow chart showing an example of using a mode of on-line payment to server a request for payment upon validating correlated personal identification information obtained from the government-issued identification document, Like reference symbols in the various drawings indicate like elements.

FIG. 10 is a flow chart showing an example of using a mode of on-line payment to server a request for payment upon validating correlated personal identification information obtained from the government-issued identification document. The correlated PII 906 may be validated against an authoritative system of record (1002). As described above, the validation may be performed locally by comparing the correlated PII 906 with a local copy of the authoritative system of record (SoR). The validation may also be performed by transmitting the correlated PII 906 to a remote server hosting a central copy of the authoritative SoR. The comparison may be performed on the remote server and the comparison results may be relayed back to the mobile device. In some implementations, the remote server may be located at and administered by a government agency, such as, for example, the DMV, the USCIS, the TSA, etc. In other implementations, the remote server may be managed by a commercial entity, such as a subcontracting entity of the government agency. The subcontracting entity may be entrusted by the government agency. In some implementations, the payload of the correlated PII may be as low as a few bits. Thus, scaling up of the implementations disclosed herein may be feasible and extensive deployment of the implementations may not be prone to denial of service (DoS) attacks.

The status of the validation may be determined (1004). If the validation is not successful, the request for payment 1010 may be rejected (1006). If the validation is successful, payment may be rendered using the mode of on-line payment associated with the government-issued identification document (1008).

Validation result 512 may depend on request for payment 1010. For example, if the request involves payment under $100, then the validation may be cursory and may not be as thorough as a request for payment of $1000. For example, if the request is for purchasing alcohol at the point of sale, the validation may focus on the holder's age and driving history. This validation may also depend on when the request is submitted. For example, in the case of purchasing alcohol at the point of sale, if the request is submitted after 9 pm, the validation may be conducted more strictly than during day time. For example, in jurisdictions that outlaw drinking or sale of alcohol after 9 pm, the request may be denied. In some implementations, the validation may additionally factor in the authorized user's behavior history. For example, if the request is submitted from an area where the authorized user is believed to be absent, then the request may be blocked. The areas where the authorized user is believed to be present may be configured in accordance with the travel schedule of the authorized user. The areas outside the areas of presence may be the areas of absence.

In some implementations, after payment has been rendered using the mode of on-line payment, the transaction may be rolled back if identity theft has been confirmed to have tainted the transaction. The ID theft may be confirmed by the bank, credit card company, intermediary account hosting company.

By associating a government-issued identification document with a payment mode, rendering payment may be made by presenting the government-issued identification document as the authenticating credential. Payment may be rendered without presentations of further credentials associated with the payment mode.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:
1. A method implemented using a mobile device and a sensor of the mobile device, the method comprising:
   generating an association between an identification document of a user and an account used to electronically process a transaction;

obtaining, using a sensor of the mobile device, identifying information about the user to determine a relationship between the user and the account;

determining that the user is authorized to request processing of the transaction using the account, based on the identifying information and the association between the identification document and the account; and processing the transaction using currency associated with the account in response to determining that the user is authorized to request processing of the transaction.

2. The method of claim 1, wherein obtaining the identifying information comprises:

obtaining data corresponding to a biometric of the individual; and obtaining identifying information from the identification document of the user.

3. The method of claim 2, wherein determining that the user is authorized to request processing of the transaction comprises:

determining that the user is authorized to request processing of the transaction using the account, based on the biometric of the individual and the association between the identification document and the account.

4. The method of claim 3, wherein processing the transaction comprises:

using the sensor to obtain the data corresponding to the biometric of the individual; and authenticating, using the mobile device, a request for payment based on the biometric of the individual.

5. The method of claim 3, wherein:

obtaining the identifying information comprises, obtaining the data corresponding to the biometric of the individual from the sensor of the mobile device; and processing the transaction comprises, authenticating, using the mobile device, a request for payment based on the biometric of the individual.

6. The method of claim 3, wherein processing the transaction comprises:

authenticating, using the mobile device, a request for payment based on personally identifiable information (PII) of the user, wherein the PII is obtained based on facial recognition technology.

7. The method of claim 1, further comprising:

extracting encrypted data encoded by a digital watermark applied to the identification document;

decrypting the encrypted data encoded by the digital watermark to obtain decrypted data; and determining that the user is authorized to request processing of the transaction based on the decrypted data encoded by the digital watermark.

8. The method of claim 7, wherein extracting the encrypted data encoded by the digital watermark comprises:

extracting frequency-domain information;

extracting spatial-domain information; or extracting mixed-domain information.

9. The method of claim 8, wherein extracting frequency-domain information comprises:

extracting spectrum information represented by coefficients in a particular spatial frequency range.

10. A system for processing transactions using a mobile device and a sensor of the mobile device, the system comprising:

one or more processing devices; and one or more non-transitory machine-readable storage devices storing instructions that are executable by the one or more processing devices to cause performance of operations comprising:

generating an association between an identification document of a user and an account used to electronically process a transaction;

obtaining, using a sensor of the mobile device, identifying information about the user to determine a relationship between the user and the account;

determining that the user is authorized to request processing of the transaction using the account, based on the identifying information and the association between the identification document and the account; and processing the transaction using currency associated with the account in response to determining that the user is authorized to request processing of the transaction.

11. The system of claim 9, wherein obtaining the identifying information comprises:

obtaining data corresponding to a biometric of the individual; and obtaining identifying information from the identification document of the user.

12. The system of claim 10, wherein determining that the user is authorized to request processing of the transaction comprises:

determining that the user is authorized to request processing of the transaction using the account, based on the biometric of the individual and the association between the identification document and the account.

13. The system of claim 11, wherein processing the transaction comprises:

using the sensor to obtain the data corresponding to the biometric of the individual; and authenticating, using the mobile device, a request for payment based on the biometric of the individual.

14. The system of claim 11, wherein:

obtaining the identifying information comprises, obtaining the data corresponding to the biometric of the individual from the sensor of the mobile device; and processing the transaction comprises, authenticating, using the mobile device, a request for payment based on the biometric of the individual.

15. The system of claim 11, wherein processing the transaction comprises:

authenticating, using the mobile device, a request for payment based on personally identifiable information (PII) of the user, wherein the PII is obtained based on facial recognition technology.

16. The system of claim 9, wherein the operations further comprises:

extracting encrypted data encoded by a digital watermark applied to the identification document;

decrypting the encrypted data encoded by the digital watermark to obtain decrypted data; and determining that the user is authorized to request processing of the transaction based on the decrypted data encoded by the digital watermark.

17. The system of claim 16, wherein extracting the encrypted data encoded by the digital watermark comprises:

extracting frequency-domain information;

extracting spatial-domain information; or extracting mixed-domain information.

18. The system of claim 17, wherein extracting frequency-domain information comprises:

extracting spectrum information represented by coefficients in a particular spatial frequency range.

19. One or more non-transitory machine-readable storage devices storing instructions for processing transactions using a mobile device and a sensor of the mobile device, the instructions being executable by one or more processing devices to cause performance of operations comprising:

generating an association between an identification document of a user and an account used to electronically process a transaction;

obtaining, using a sensor of the mobile device, identifying information about the user to determine a relationship between the user and the account;

determining that the user is authorized to request processing of the transaction using the account, based on the identifying information and the association between the identification document and the account; and processing the transaction using currency associated with the account in response to determining that the user is authorized to request processing of the transaction.

20. The machine-readable storage devices of claim 19, wherein the operations further comprises:

extracting encrypted data encoded by a digital watermark applied to the identification document;

decrypting the encrypted data encoded by the digital watermark to obtain decrypted data; and determining that the user is authorized to request processing of the transaction based on the decrypted data encoded by the digital watermark.

* * * * *